June 22, 1954  A. C. STOVER  2,681,812
MOUNTING FOR VEHICLE AXLES FOR SWINGING AND ROCKING MOVEMENT
Filed Oct. 3, 1949  3 Sheets-Sheet 1
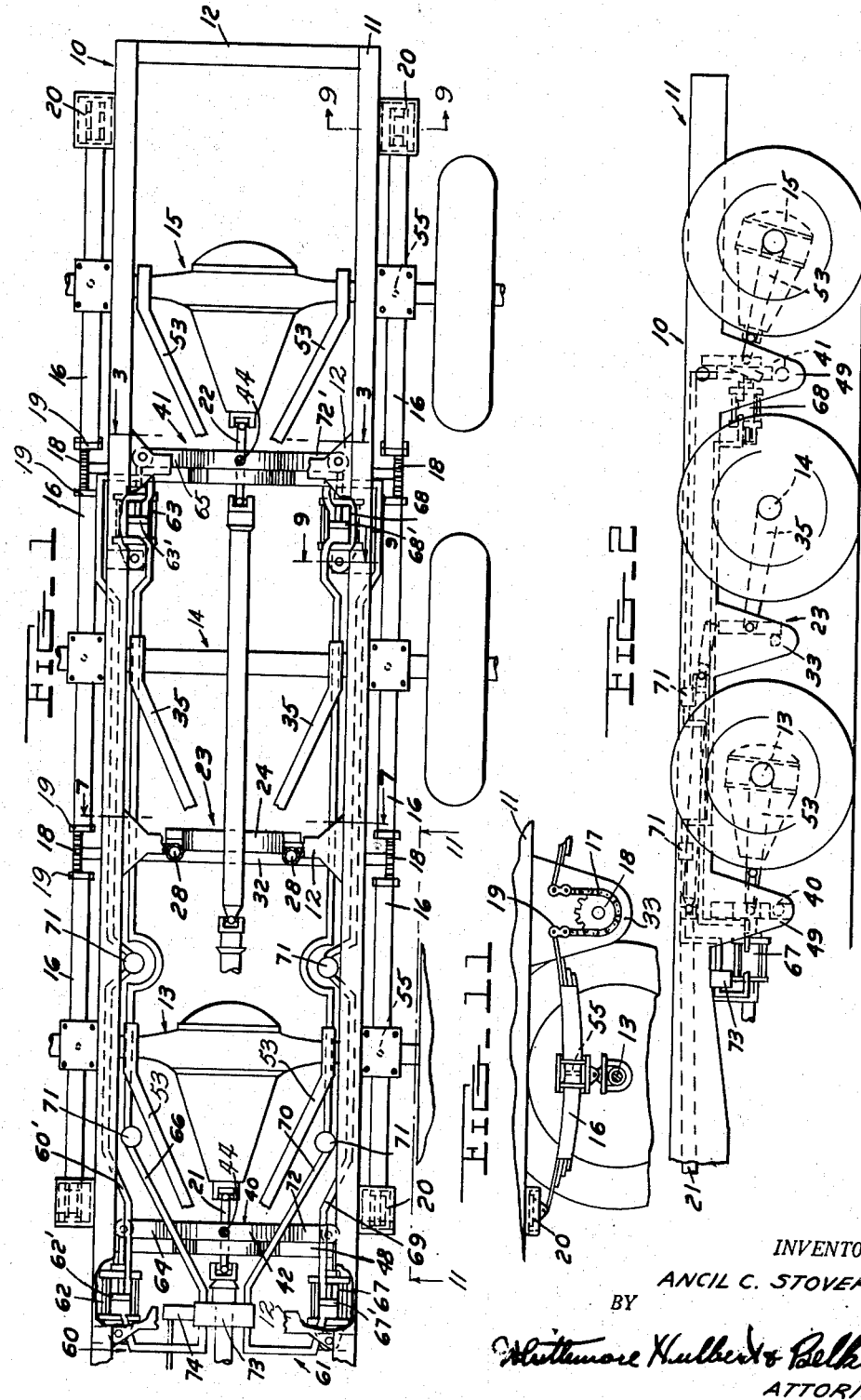
INVENTOR.
ANCIL C. STOVER
BY
Whittemore Hulbert & Belknap
ATTORNEYS

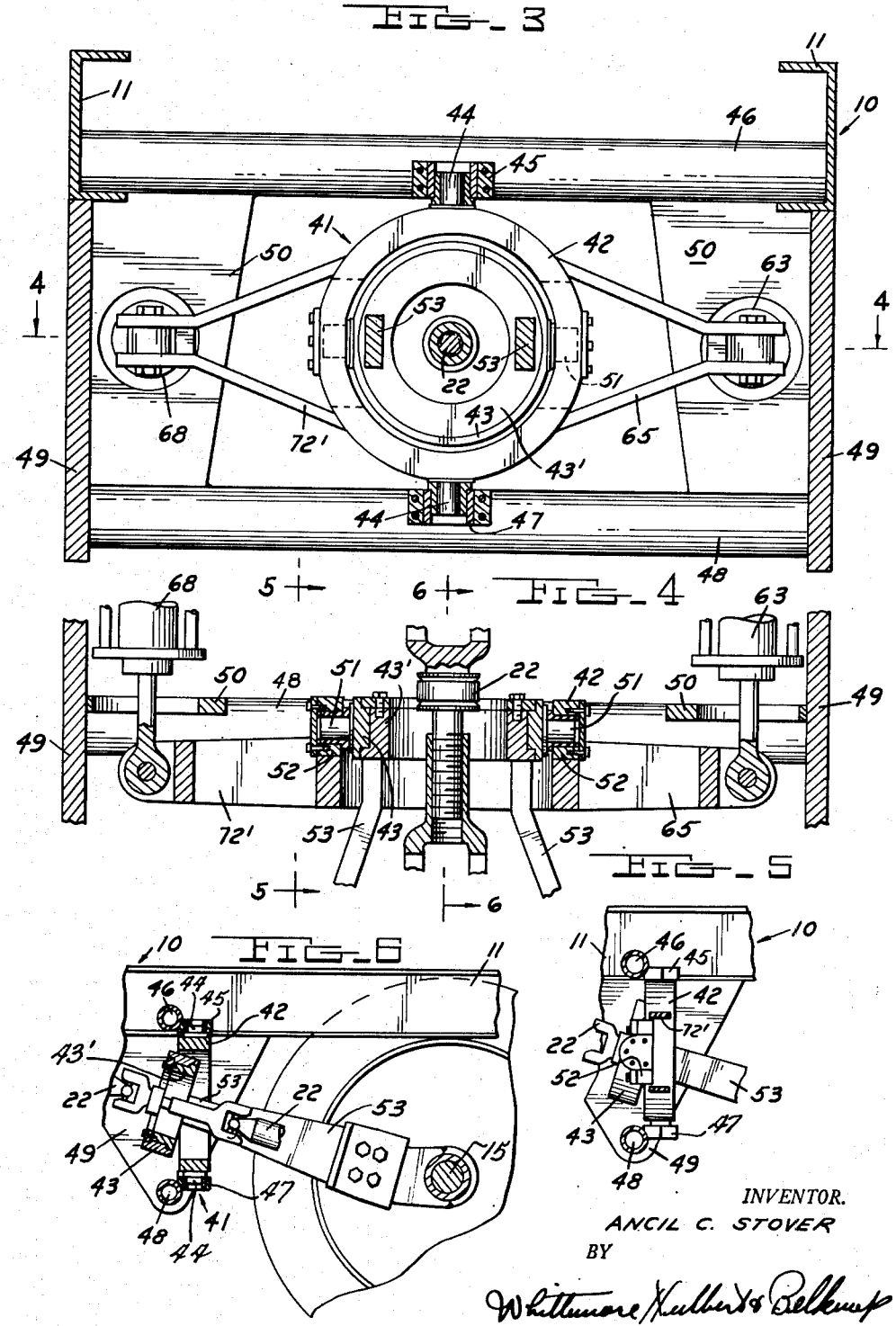

June 22, 1954 A. C. STOVER 2,681,812
MOUNTING FOR VEHICLE AXLES FOR SWINGING AND ROCKING MOVEMENT
Filed Oct. 3, 1949 3 Sheets-Sheet 3
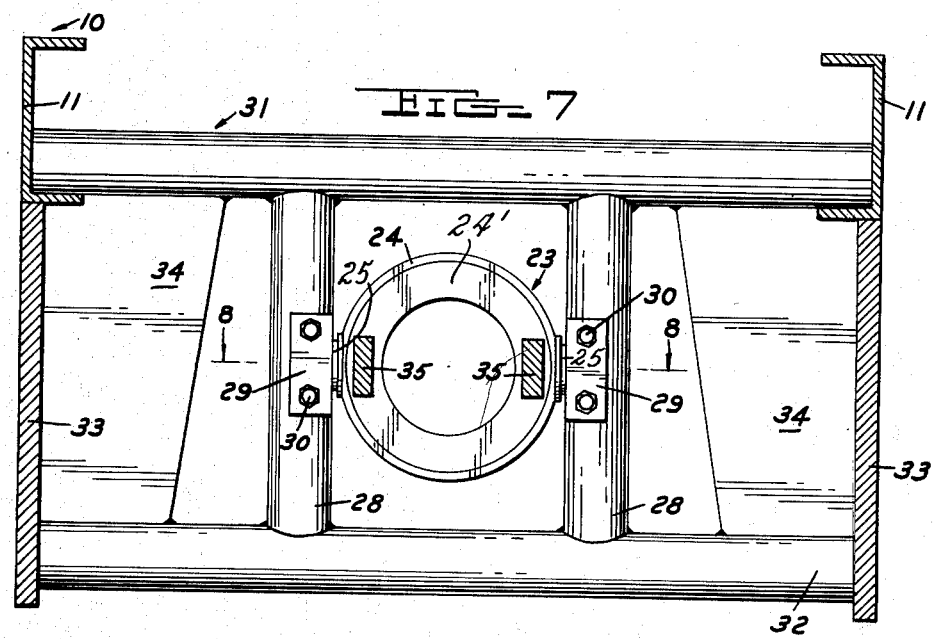
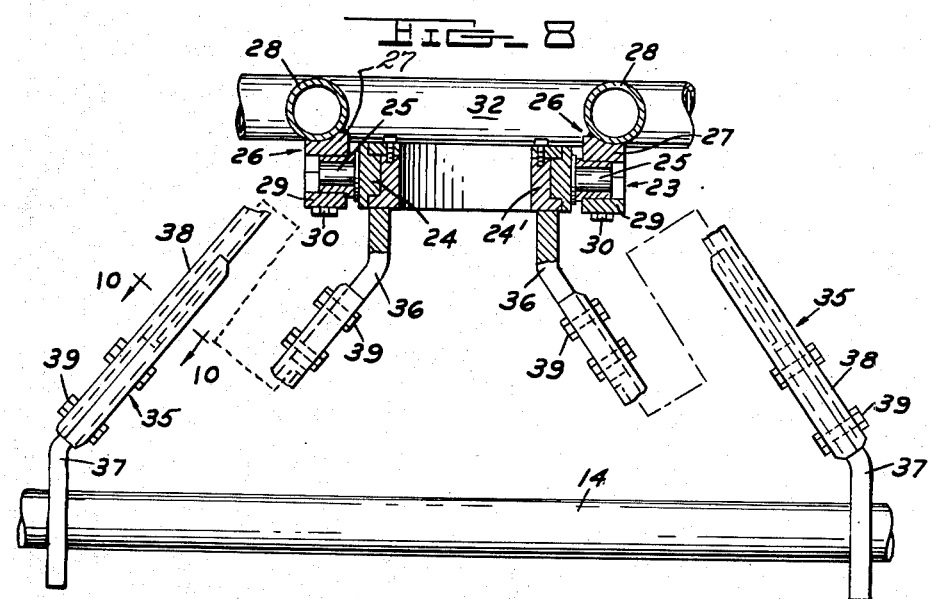
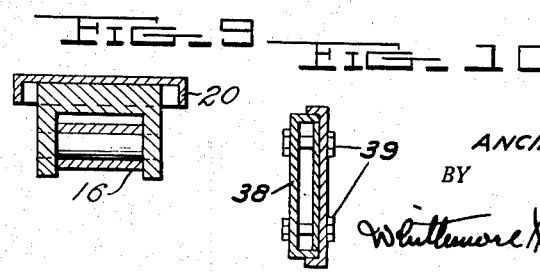
INVENTOR.
ANCIL C. STOVER
BY
ATTORNEYS Patented June 22, 1954

2,681,812

UNITED STATES PATENT OFFICE 2,681,812

MOUNTING FOR VEHICLE AXLES FOR SWINGING AND ROCKING MOVEMENT

Ancil C. Stover, Van Wert, Ohio, assignor to William W. Eisenhauer, William P. Ellwood, Ida J. Eisenhauer, and Leigh E. Eisenhauer, copartners doing business as The Eisenhauer Manufacturing Company, Van Wert, Ohio Application October 3, 1949, Serial No. 119,223

7 Claims. (Cl. 280—110)

This invention relates generally to vehicles having tandemly arranged axles and refers more particularly to improved mountings for the axles on the chassis frame of the vehicle.

It is an object of this invention to provide an axle mounting supported on the vehicle chassis frame intermediate the side sills in a manner to permit tipping movement of the axle in a substantially vertical plane as well as up and down movement about a horizontal axis. In accordance with this invention the mounting includes a ring and an annular section supported by the ring within the latter for rotation. The ring is supported on the frame for pivotal movement about a substantially horizontal axis and the annular section is connected to opposite end portions of the axle.

It is another object of this invention to provide a mounting of the above general type wherein the ring assembly, noted in the preceding paragraph, is pivotally supported by an outer ring which, in turn, is pivotally mounted on the vehicle chassis frame for rocking movement about a substantially vertically extending axis. Thus the axle connected to the annular section of the inner ring may also turn about the axis of rocking movement of the outer ring. This mounting is desirable especially in vehicles of substantial length equipped with tandem axles since it enables supporting one or more of the axles so that the latter will turn with the front steering axle.

It is still another feature of this invention to support the double trunnion on the chassis frame in a position to enable extending the propeller shaft of the vehicle through the inner ring.

The foregoing as well as other objects will be made more apparent as this description proceeds, especially when considered in connection with the accompanying drawings, wherein:

Figure 1 is a semi-diagrammatic plan view of a part of a vehicle chassis having tandemly arranged axles mounted in accordance with this invention;

Figure 2 is a side elevational view of the construction shown in Figure 1;

Figure 3 is a cross-sectional view taken on the line 3—3 of Figure 1;

Figure 4 is a sectional view taken on the line 4—4 of Figure 3;

Figure 5 is a sectional view taken on the line 5—5 of Figure 4;

Figure 6 is a sectional view taken on the line 6—6 of Figure 4;

Figure 7 is a sectional view taken on the line 7—7 of Figure 1;

Figure 8 is a sectional view taken on the line 8—8 of Figure 7;

Figure 9 is a sectional view taken on the line 9—9 of Figure 1;

Figure 10 is a sectional view taken on the line 10—10 of Figure 8, and

Figure 11 is a sectional view taken on the line 11—11 of Figure 1.

In Figure 1 of the drawings, I have shown a vehicle chassis having a frame 10 comprising side sills 11 secured in laterally spaced relationship by crossbars 12. Extending beneath the frame 10 in a direction transverse to the length of the frame is a plurality of axles designated by the numerals 13, 14 and 15. Each axle is connected to the frame 10 by a pair of semi-elliptical leaf springs 16 respectively supported at opposite sides of the frame for movement relative to the frame in the direction of length of the latter. As shown in Figure 11 of the drawings, the adjacent ends of the springs 16 at opposite sides of the frame 10 are connected together by chains 17 and sprockets 18. The sprockets 18 are supported for rotation on the frame below the adjacent ends of the springs and the chains 17 are respectively reeved over the undersides of the sprockets 18. The upper ends of the chains are respectively pivotally connected to the adjacent ends of the springs by suitable shackles 19 in a manner such that all of the springs cooperate to control movement of the chassis frame 10 relative to the axles. The springs 16 at opposite ends of the frame have the extremities thereof slidably supported on seats 20 which in turn are secured to the frame 10. Thus all of the springs are capable of limited shifting movement longitudinally and laterally relative to the frame 10. The pairs of leaf springs 16 at opposite sides of the frame 10 are respectively connected intermediate the ends thereof to the axles by any suitable type of clamping means which forms no part of the present invention and need not be described in detail.

In the present instance, the axle 13 is a driving axle and is operatively connected to the power source or internal combustion engine (not shown) by a suitable propeller shaft 21. The axle 15 is also shown herein as a driving axle and is connected to the power source or internal combustion engine (not shown) by a propeller shaft 22. The intermediate axle 14 is preferably an idler axle and merely cooperates with the other axles in supporting the load.

The axles 13, 14 and 15 are respectively connected to the chassis frame 10 for movement relative to the chassis frame independently of one another. The connection between the intermediate axle 14 and the frame 10 comprises a mounting 23 shown in Figures 1 and 7 of the drawings. The mounting 23 has a ring 24 supported for swinging movement about a horizontal axis extending substantially parallel to the axis of the axle 14 and connected to the latter, in a manner to be presently described, to permit up and down movement of the axle 14 relative to the frame 10. In detail, the ring 24 has a pair of trunnions 25 suitably secured to diametrically opposite sides thereof and journalled in suitable bearing blocks 26. The bearing blocks 26 are shown in Figure 8 of the drawings as having sections 27 respectively welded or otherwise permanently secured to laterally spaced vertically extending tubes 28 and as also having caps 29 removably secured to the sections 27 by studs 30. The vertical tubes 28 are secured in proper laterally spaced relationship on the frame 10 by vertically spaced transverse tubes 31 and 32. The top tube 31 extends between the sills 11 of the frame and the bottom tube 32 extends between the lower ends of a pair of plates 33 having their upper ends respectively welded or otherwise permanently fastened to the sills 11 of the frame. If desired, the above structure may be reinforced by gusset plates 34 respectively secured to the plates 33 and extending between the tubes 31 and 32. The gusset plates are preferably welded to the tubes as well as to the plates 33 in order to impart substantial rigidity to the support for the mounting 23.

Supported within the ring 24 in concentric relation thereto is an annular section 24'. The section 24' is rotatable about the axis of the ring 24 and is connected at opposite sides to the axle 14 by a pair of struts 35. The mounting is such as to permit movement of the axle 14 about the horizontal axis of the trunnions 25 and to also permit tipping movement of the axle 14 about the axis of rotation of the annular section 24' relative to the ring 24. It will be noted from Figure 8 of the drawings that the struts 35 have arms 36 at the front ends thereof which are welded to diametrically opposite sides of the ring 24' and are provided with arms 37 at the rear ends which are respectively connected to the opposite end portions of the axle 14. The arms 36 and 37 of each strut are adjustably connected by tubular members 38 having their opposite ends clamped to the arms by studs 39.

The axles 13 and 15, in addition to being connected to the chassis frame 10 for tipping and swinging movement in an up and down direction, are also capable of turning movement so as to turn with the front steering wheels (not shown) of the vehicle. The axle 13 is connected to the frame 10 by a mounting 40 and the axle 15 is connected to the frame 10 by a mounting 41. These two mountings are identical in construction and accordingly a description of one will suffice for both. With this in view, reference is made more in detail to Figures 3 to 6, inclusive, of the drawings wherein the mounting 41 is shown in detail. This mounting comprises a double trunnion having an outer ring 42, an inner ring 43, and an annular section 43' rotatably supported in the inner ring 43. Two vertically aligned trunnions 44 are respectively secured to the top and bottom of the outer ring 42. The top trunnion 44 is journalled in a bearing 45 secured to a tubular crossbrace 46 intermediate the ends thereof. The bottom trunnion 44 is journalled in a bearing 47 which is secured to a second tubular brace 48 intermediate the ends of the latter. The tubular brace 46 extends between the side sills 11 of the frame 10 and is welded or otherwise permanently secured to the sills. The bottom tubular brace 48 extends between the lower ends of a pair of plates 49 having the upper ends respectively welded to the side sills 11. Suitable vertically extending gusset plates 50 extend between the tubes 46 and 48 at opposite ends of the latter. These plates are respectively welded to the depending plates 49 and are also welded to the tubes 46 and 48 in order to provide a rigid support for the mounting 41. The above construction is such that the mounting 41 is supported in a position to enable the propeller shaft 22 to be extended through the inner ring 43' of the mounting. The mounting 40 is supported in a similar manner on the chassis frame 10 in a position to enable free passage of the propeller shaft 21 through the inner ring of the mounting 40.

Two trunnions 51 are secured to diametrically opposite sides of the inner ring 43 with their axes in alignment and extending parallel to the axis of the axle 15. The trunnions 51 are respectively journalled in bearings 52 secured to the outer ring 42 in a manner to permit swinging movement of the inner ring 43 relative to the outer ring 42 about a substantially horizontal axis which is parallel to the axis of the axle 15. The annular section 43' is supported within the ring 43 in concentric relation thereto and is rotatable relative to the ring 43.

The annular section 43' is connected at diametrically opposite sides to the axle 15 by a pair of struts 53 which may be similar in construction to the struts 35 previously described. In any case, the construction is such as to permit the axle 15 to turn about the vertical axis of the trunnions 44 to swing about the horizontal axis of the trunnions 51 and to tip in a substantially vertical plane about the axes of the rings. Since the mounting 40 is identical to the mounting 41, it also follows that the axle 13 is capable of the same movements as the axle 15.

Since both the axles 13 and 15 are capable of turning movement about substantially vertically extending axes, it follows that the leaf springs 16 connecting these axles to the frame are subjected to lateral stresses during turning movement of the axles. In order to materially reduce these stresses, it is preferred to connect the leaf springs to the axles in a manner to enable limited rocking movement of the axles relative to the springs about axes which extend generally parallel to the axes of turning movement of the axles. A spring mounting capable of accomplishing the above result is shown generally in Figure 11 of the drawings and is designated by the numeral 55. This spring mounting forms the subject matter of my copending application Ser. No. 119,224, filed October 3, 1949, since issued as Patent No. 2,624,593, and is therefore not described in detail herein. It is pointed out, however, that rocking movement of the axles applies lateral force components on the springs 16 associated with these axles and limited lateral shifting movement of the springs relative to the frame 10 is permitted by the chains 17 and seats 20.

Due to the nature of the mountings 40 and 41 and owing to the frictional engagement of the ground engaging wheels on these axles with the road surface, it follows that both axles 13 and 15 will turn with the front steering wheels of the vehicle. In the present instance, the rear axle 15 actually turns in a direction opposite the direction of movement of the axle 13 when the vehicle is turned from a straight course of travel and provision is made herein for resisting relative turning movement between the two axles under practically any conditions of operation.

With the above in view, reference is again made to Figure 1 of the drawings wherein it will be noted that opposite ends of the axles 13 and 15 are in effect respectively connected by two closed hydraulic systems designated generally by the numerals 60 and 61. These systems and the manner in which they operate to control the turning movement of the two axles 13 and 15 form the subject matter of my copending application Serial No. 119,222, filed October 3, 1949, since issued as Patent No. 2,643,895, and need not be described in detail herein. It will suffice to point out that the system 60 comprises a pair of cylinders 62 and 63 respectively supported on one side sill 11 of the frame adjacent the mountings 40 and 41. A piston 62' is slidably supported in the cylinder 62 and is operatively connected to one side of the outer ring 42 of the mounting 40 by an arm 64. A piston 63' is slidably supported in the cylinder 63 and is connected to the corresponding side of the ring 42 of the mounting 41 by an arm 65. The end of the cylinder 62 at the rear side of the piston 62' has a fluid connection 60' with the cylinder 63 at the rear side of the piston in this cylinder and the front end of the cylinder 62 is connected by a conduit 66 to the front end of the cylinder 63.

The fluid system 61 at the opposite side of the vehicle also has two cylinders 67 and 68 respectively supported on the adjacent side sill 11. The rear end of the cylinder 67 is connected to the corresponding end of the cylinder 68 by a conduit 69 and the front end of the cylinder 67 is connected to the front end of the cylinder 68 by a conduit 70. The piston 67' in the cylinder 67 is connected to the side of the ring 42 of the mounting 40 opposite the side to which the piston 62' is connected and this is accomplished by an arm 72. The piston 68' in the cylinder 68 is connected to the corresponding side of the ring 42 associated with the mounting 41 by an arm 72' which is opposed to the arm 65. Both systems include reservoirs 71 and are completely filled with a suitable hydraulic fluid medium.

It follows from the foregoing that when the axle 13 is turned about the vertically aligned axes of the trunnions 44 in an anti-clockwise direction as viewed in Figure 1 of the drawings, the pistons 62' and 67' in the respective cylinders 62 and 67 are moved in opposite directions by the ring 42 of the mounting 40 for the axle 13. More particularly, the piston 62' moves forwardly in the cylinder 62 and the piston 67' moves rearwardly in the cylinder 67. The displacement of hydraulic fluid medium in the two systems 60 and 61, resulting from the above movement of the pistons 62' and 67', causes the piston 63' in the cylinder 63 to move rearwardly and the piston 68' in the cylinder 68 to move forwardly. Since the pistons 63' and 68' are respectively connected to opposite sides of the ring 42 associated with the mounting 41 and since this ring 42 is connected to the axle 15, it follows that the latter axle is turned in a clockwise direction or in a direction opposite the direction of turning movement of the axle 13. However, the angular distance throughout which the axle 15 turns is the same as the extent of turning movement of the axle 13 so that turning of the ground engaging wheels on these axles with the front steering wheels (not shown) is assured. Moreover, any tendency for one axle to turn relative to the other due to road conditions is resisted and the stability of the vehicle is greatly improved.

Under some conditions, it may be advantageous to lock the axles 13 and 15 against turning movement with the front steering wheels and this may be accomplished by providing a shut-off valve 73 in the two hydraulic systems 60 and 61. This valve is normally open so that both hydraulic systems are operative and may be closed by manipulating an air valve 74 through a suitable control (not shown) located within the cab of the vehicle.

What I claim as my invention is:

1. In a vehicle, a frame including side sills, an axle beneath said frame provided with a forwardly extending thrust member, a ring secured to the forward end of said thrust member with its axis normal to the axis of the axle, and a connection between said axle and frame comprising plates secured to and depending from the opposite side sills, a cross frame including spaced parallel cross members, respectively, between said sills and the lower ends of said plates, a second ring having a swivel engagement with the first ring and provided with diametrically opposite horizontally extending trunnions, a third ring surrounding and coaxial with the first and second rings having bearings thereon for the trunnions of said second ring, said third ring having diametrically opposite vertically extending trunnions and bearings on the cross members of said cross frame for said vertical trunnions.

2. In a vehicle, a frame having laterally spaced side sills and having a frame support extending between the side sills, an axle extending transversely of the side sills, a connection between the axle and frame support comprising a first ring positioned intermediate the ends of the axle and spaced to one side of said axle with the axis of said ring extending normal to the axis of the axle, means securing the first ring to said axle, a second ring coaxial with the first ring and pivotally mounted on said frame support for turning movement about a substantially vertical axis, a third ring supported in coaxial relationship to both the first and second rings and rotatable relative to said first and second rings, and a pivotal connection between the second and third rings permitting turning movement of the third ring with respect to said second ring about a substantially horizontal axis.

3. The construction defined in claim 2 having means connected to the second ring for controlling movement of said second ring and axle.

4. In a vehicle, a frame, a pair of axles extending transversely of the frame and spaced from each other lengthwise of the frame, a thrust member extending from each axle in the direction of length of the frame, means pivotally connecting each thrust member to the frame for permitting swinging movement of the axles both vertically and horizontally, each of said pivotal connecting means comprising a first ring secured to the adjacent thrust member with the axis of the ring extending normal to the axis of the associated axle, a second ring coaxial with the first ring and rotatably engaging the first ring, a third ring coaxial with the first and second rings and connected to the frame for turning movement about a vertical axis, a pivotal connection between the second ring and the third ring permitting turning movement of the second ring about a horizontal axis, and a connection between the third ring of said connecting means for compelling horizontal swinging movement of one axle in response to horizontal swinging movement of the other axle.

5. In a vehicle, a frame structure, an axle extending transversely of the frame structure, a connection between the frame structure and axle, said connection comprising first and second concentric rings positioned to one side of the axle intermediate the ends of the latter in a plane parallel to a substantially vertically extending plane including the axis of the axle, means supporting the second ring for rotation relative to the first ring, a third ring coaxial with the first and second rings and pivotally connected to the frame structure for turning movement about a substantially vertically extending axis, means pivotally connecting the first ring to the third ring for swinging movement about an axis extending substantially parallel to the axis of said axle, and means rigidly connecting the second ring to said axle.

6. In a vehicle, a frame, a pair of axles extending transversely of the frame and spaced from each other lengthwise of the frame, means pivotally connecting each axle to the frame for permitting swinging movement of the axles both horizontally and vertically, each of said pivotal connecting means comprising a first ring positioned to one side of the associated axle intermediate the ends of the latter in a plane parallel to a substantially vertical plane including the axis of said associated axle and secured to the latter, a second ring coaxial with the first ring and rotatably supporting the first ring, a third ring coaxial with the first and second rings and pivotally connected to the frame for turning movement about a substantially vertically extending axis, a pivotal connection between the second ring and the third ring permitting turning movement of the second ring relative to the third ring about a horizontal axis, and means connecting the third rings of said axle connecting means for compelling horizontal swinging movement of one axle in response to horizontal swinging movement of the other axle.

7. The structure defined in claim 6 comprising an axle intermediate said pair of axles, means pivotally connecting the intermediate axle to the frame for permitting angular movement of the intermediate axle in a vertical plane and up and down swinging movement of the intermediate axle, said pivotal connecting means comprising a first ring positioned to one side of the intermediate axle between the ends of the latter in a plane extending parallel to a substantially vertical plane including the axis of the intermediate axle and secured to the latter axle, a second ring rotatably supporting the first ring and pivotally connected to the frame for turning movement about an axis extending substantially parallel to the axis of said intermediate axle.

References Cited in the file of this patent

UNITED STATES PATENTS

| Number | Name | Date |
| --- | --- | --- |
| 750,854 | Hodil | Feb. 2, 1904 |
| 847,647 | Calkins | Mar. 19, 1907 |
| 1,066,072 | Bouas | July 1, 1913 |
| 1,186,338 | Sandstrom | June 6, 1916 |
| 1,210,055 | Fairman | Dec. 26, 1916 |
| 1,402,175 | Overman | Jan. 3, 1922 |
| 1,533,518 | Schlack | Apr. 14, 1925 |
| 2,047,088 | Thornton | July 7, 1936 |
| 2,269,728 | Mills | Jan. 13, 1942 |
| 2,272,572 | Merry | Feb. 10, 1942 |
| 2,296,681 | Merry | Sept. 22, 1942 |
| 2,598,863 | Tucker | June 3, 1952 |